US012586375B2

(12) United States Patent
Younessian et al.

(10) Patent No.: US 12,586,375 B2
(45) Date of Patent: Mar. 24, 2026

(54) CONTENT VALIDATION USING SCENE MODIFICATION

(71) Applicant: Comcast Cable Communications, LLC, Philadelphia, PA (US)

(72) Inventors: Ehsan Younessian, Washington, DC (US); Renxiang Li, Lake Zurich, IL (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 786 days.

(21) Appl. No.: 17/231,864

(22) Filed: Apr. 15, 2021

(65) Prior Publication Data

US 2022/0337761 A1     Oct. 20, 2022

(51) Int. Cl.
*G06V 20/40*          (2022.01)
*H04N 5/262*          (2006.01)
*H04N 21/43*          (2011.01)

(52) U.S. Cl.
CPC .............. *G06V 20/48* (2022.01); *G06V 20/49* (2022.01); *H04N 5/2628* (2013.01); *H04N 21/43* (2013.01)

(58) Field of Classification Search
CPC ...... G06V 20/48; G06V 20/49; H04N 5/2628; H04N 21/43; H04N 21/23418; H04N 21/8456
USPC .......................................................... 386/263
See application file for complete search history.

(56) References Cited

U.S. PATENT DOCUMENTS

| | | | | |
|---|---|---|---|---|
| 7,457,359 | B2 * | 11/2008 | Mabey ............... | H04N 21/6379 375/240 |
| 9,641,879 | B2 * | 5/2017 | Kocks .................. | H04N 21/251 |
| 10,789,990 | B2 * | 9/2020 | Catalano ............ | H04N 21/4667 |
| 2019/0294887 | A1 * | 9/2019 | Zhao ...................... | G06V 10/98 |

* cited by examiner

*Primary Examiner* — Helen Shibru
(74) *Attorney, Agent, or Firm* — BakerHostetler

(57) ABSTRACT

Methods and systems are described for managing content. A content stream may be generated based on source content. Scenes identified in the content stream may be compared with scenes in the source content. An iterative matching process may be used to modify scene boundaries that may be compared to the scene boundaries of the content stream.

28 Claims, 9 Drawing Sheets

100

Returned

Unmatched Source

Matched Source

700

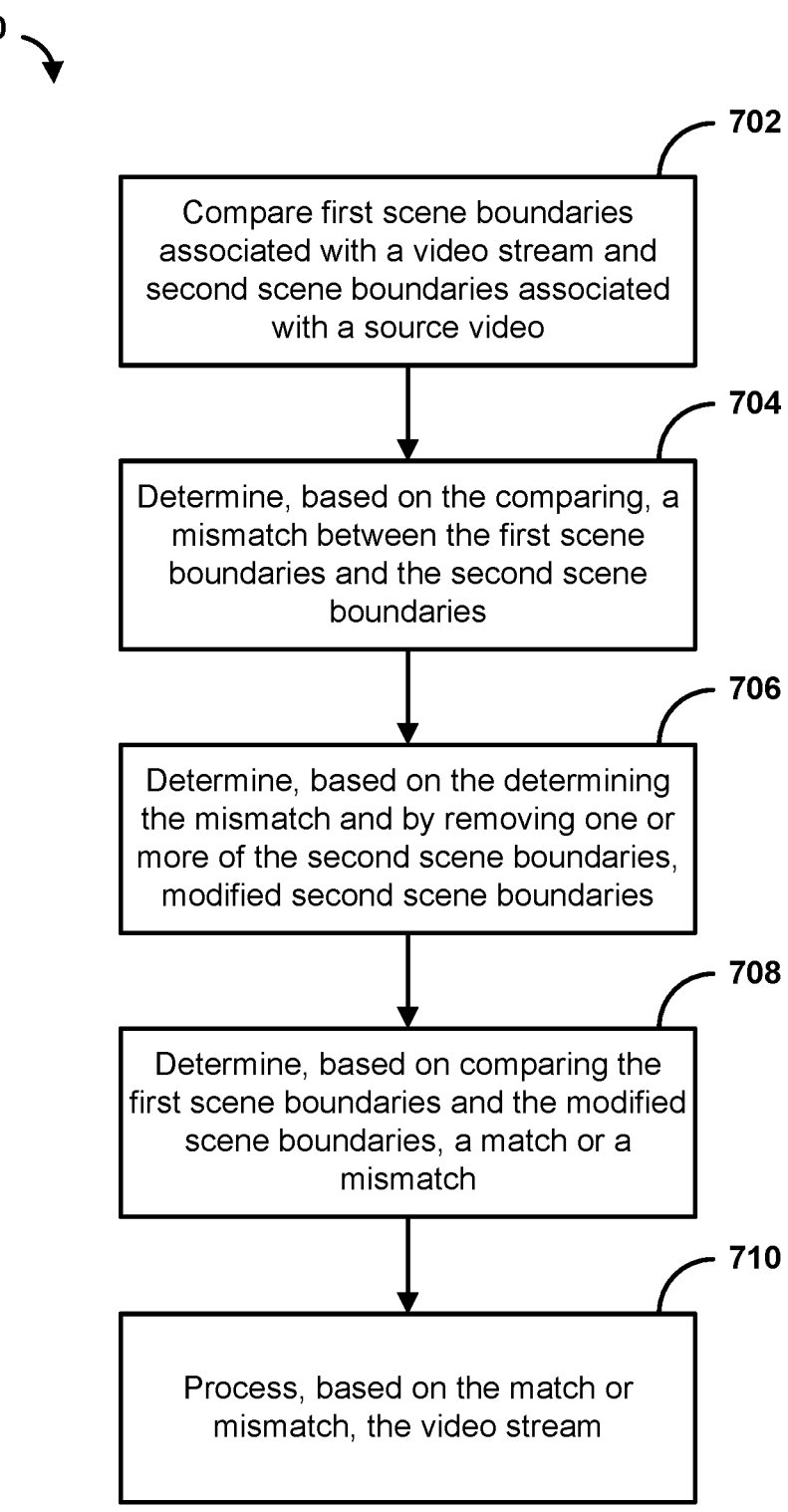

702

Compare first scene boundaries associated with a video stream and second scene boundaries associated with a source video

704

Determine, based on the comparing, a mismatch between the first scene boundaries and the second scene boundaries

706

Determine, based on the determining the mismatch and by removing one or more of the second scene boundaries, modified second scene boundaries

708

Determine, based on comparing the first scene boundaries and the modified scene boundaries, a match or a mismatch

710

Process, based on the match or mismatch, the video stream

FIG. 7

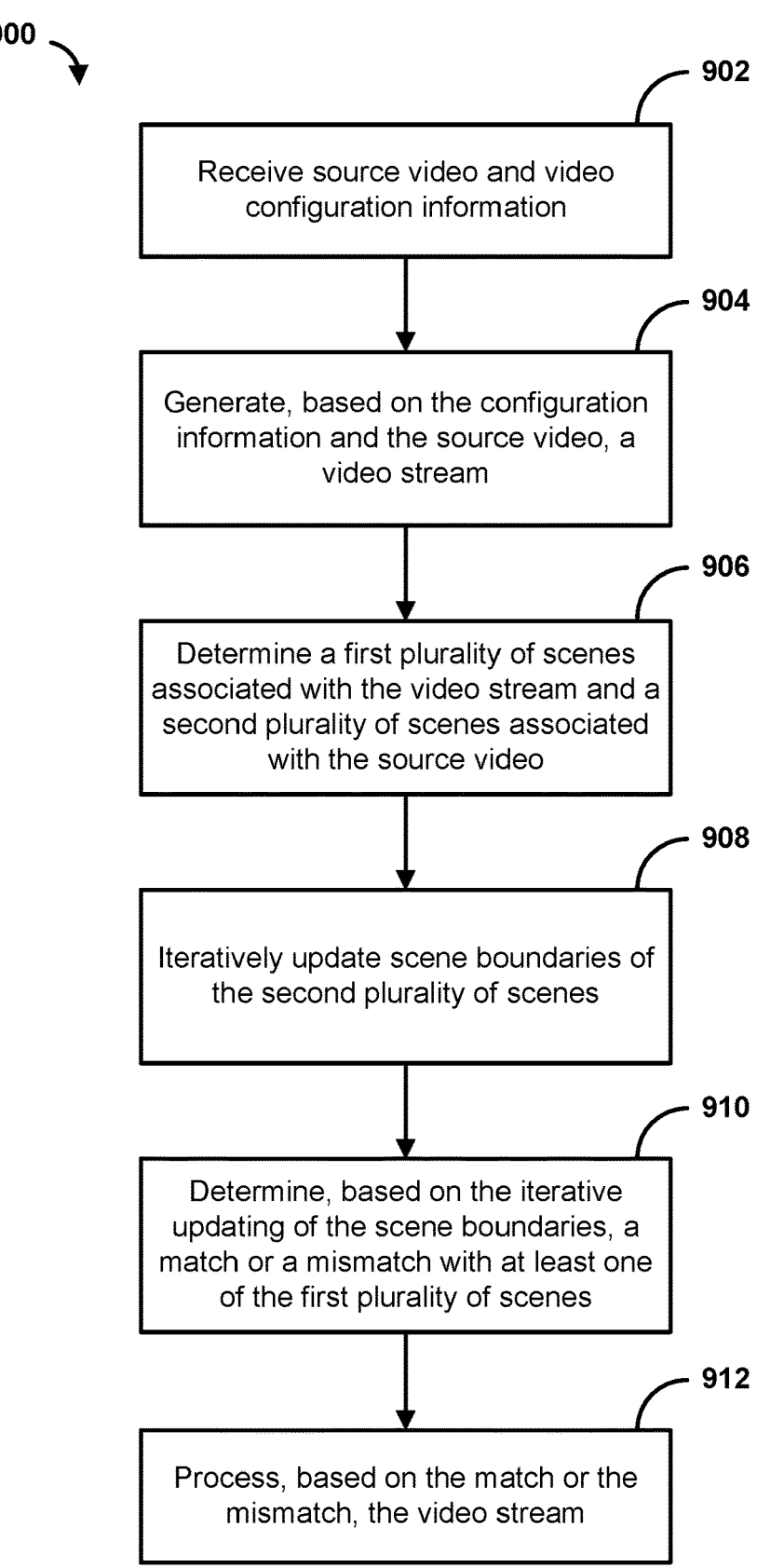

900

902

Receive source video and video configuration information

904

Generate, based on the configuration information and the source video, a video stream

906

Determine a first plurality of scenes associated with the video stream and a second plurality of scenes associated with the source video

908

Iteratively update scene boundaries of the second plurality of scenes

910

Determine, based on the iterative updating of the scene boundaries, a match or a mismatch with at least one of the first plurality of scenes

912

Process, based on the match or the mismatch, the video stream

FIG. 9

CONTENT VALIDATION USING SCENE MODIFICATION

BACKGROUND

Content, such as video, may be validated using a variety of conventional processes. These processes, however, may not be applicable if the content to be validated has been intentionally modified as compared to the source content. In these scenarios, conventional processes may provide a large number of false positives.

SUMMARY

Disclosed herein are techniques for analyzing content. A content stream (e.g., video stream) may be generated based on source content (e.g., a video file). Imaging analysis may be used to detect scenes, scene boundaries, and/or scene durations of the content stream. Scenes identified in the content stream may be compared with scenes associated with the source content. Transformation and other variations in content quality may result in scene detection in the video stream that is inconsistent with the scenes associated with the source file. A matching process may be used that includes modifying scene boundaries associated with the source content. Multiple scenes may be merged as a single scene, and the merged scene may be compared with detected scenes of the video stream. The matching process may be iterative to allow for multiple rounds of scene modification and comparison. Results of the matching process maybe used to generate analytics, send notifications, cause actions to be performed, or a combination thereof.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

FIG. 7 shows an example method for processing content.

FIG. 9 shows an example method for processing content.

DETAILED DESCRIPTION OF ILLUSTRATIVE EMBODIMENTS

Disclosed herein are methods and systems for analyzing content, such as video, audio, and/or other media. Conventional approaches for analyzing content are mainly based on different types of visual fingerprints, which are extracted per frame or per sampled frame. The fingerprints may be compared between scheduled video (e.g., or reference video, source video) video and target video (e.g., return video, generated video). However, these approaches are not suitable if the target video has additional graphics (e.g., indicating V-chip info, or current/next program details), boxes (e.g., horizontal pillar box, vertical pillar box) to accommodate standard definition (SD) content in a high definition (HD) channel or vice versa, and/or the like. Instead, conventional frame-level video fingerprinting and matching can lead to a significant number of false alarms and/or missing matches.

Disclosed herein is a scene-based (e.g., or shot based) matching approach which may be invariant to known alterations/transformations applied in generated video. The disclosed matching process may comprise a recursive soft-matching process that can handle possible missing scene boundaries (e.g., shot boundaries, hard cuts, video editing cuts) in generated video. The proposed solution could improve the matching rate significantly (e.g., up to 99.9%) compared to tested alternatives (e.g., about 90%).

A service provider may provide a syndication service in which a linear TV video stream is syndicated for a client network. The client may supply schedule data, source video materials, and additional information, such as graphics/v-chip/SCTE data. The additional information and/or schedule data may be used to transform the source video into a video stream that is provided to users (e.g., as a linear video channel).

For a given schedule timeline and video materials, the disclosed techniques may provide automatic validation of syndicated return video content to ensure videos are being aired as scheduled. The disclosed techniques may monitor return video 24/7 (e.g., video generated for the syndication service) and let the operator know if there is any incorrect content being aired. If problems are detected, the problems can trigger a troubleshooting process (e.g., switching to auxiliary return path, checking the schedule data, etc.).

The disclosed techniques may use a matching process that modifies scene boundaries associated with source content. The scene boundaries may be modified to combine multiple scenes. The combined scenes may be matched against scenes detected in generated video and/or video stream. The matching process may be performed iteratively until a match is found, an error is detected, and/or the like.

Figure 1:
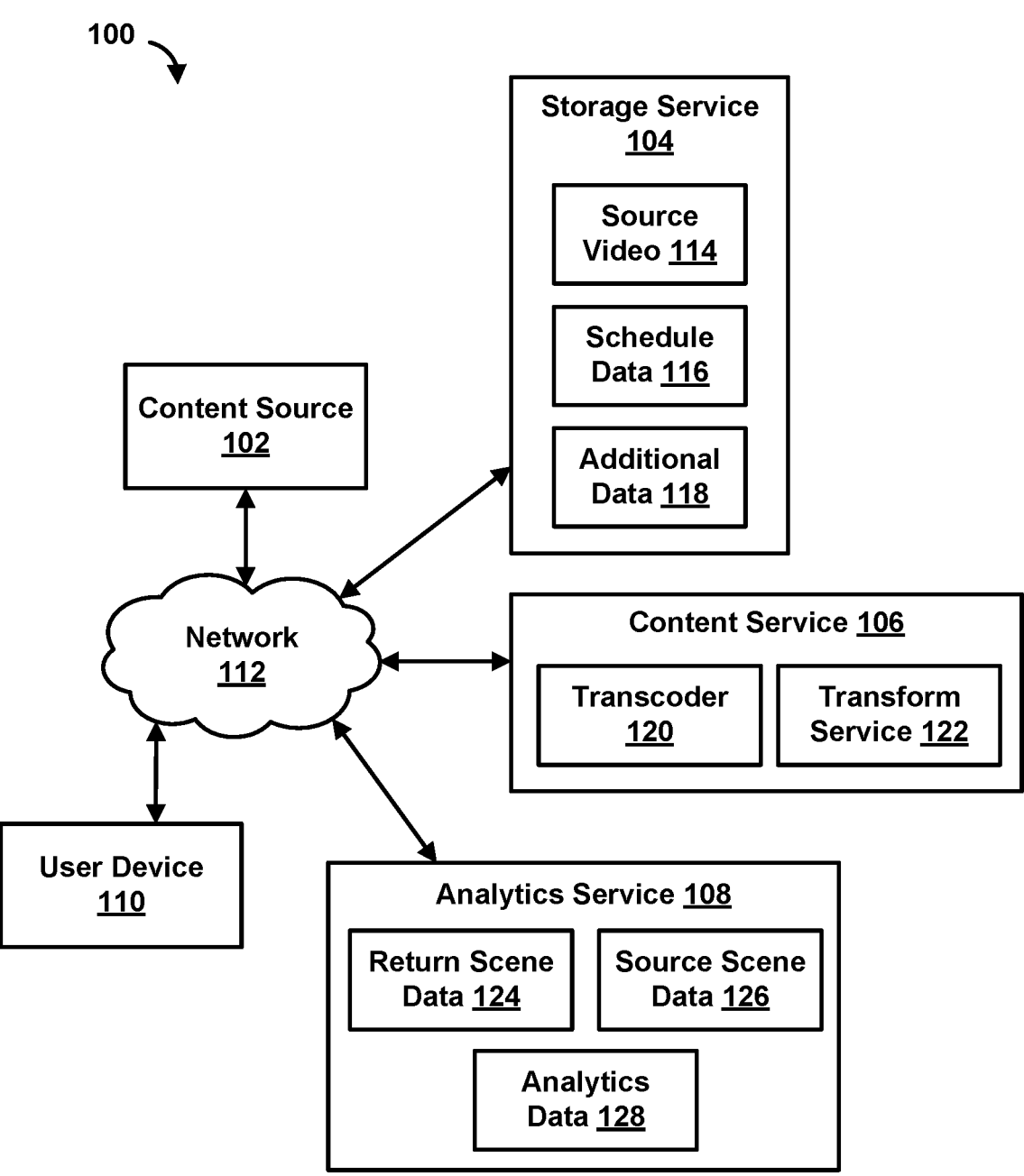
FIG. 1 shows an example system for processing content.

FIG. 1 is a block diagram showing an example system 100 for managing content. The system 100 may comprise one or more of a content source 102, a storage service 104, a content service 106, an analytics service 108, and a user device 110. The content source 102, the storage service 104, the content service 106, the analytics service 108, and the user device 110, or a combination thereof may be communicatively coupled via a network 112.

The network 112 may comprise a content distribution and/or access network. The network 112 may facilitate communication via one or more communication protocols. The network 112 may comprise fiber, cable, a combination thereof. The network 112 may comprise wired links, wireless links, a combination thereof, and/or the like. The network 112 may comprise routers, switches, nodes, gateways, servers, modems, and/or the like.

The storage service 104, the content service 106, the analytics service 108, or a combination thereof may be implemented by one or more computing nodes. A computing node may comprise a virtual machine, processor, computing device, or a combination thereof. The storage service 104, the content service 106, and/or the analytics service 108 may each be implemented on separate computing nodes (e.g., on separate computing devices). The storage service 104, the content service 106, and/or the analytics service 108 may each be implemented on the same computing node (e.g., on the same computing device). The storage service 104, the content service 106, and/or the analytics service 108 may implemented by a plurality of computing nodes. The plurality of computing nodes may be geographically dispersed (e.g., to allow efficient access to content). The storage service 104, the content service 106, and/or the analytics service 108 may be duplicated at various locations in the network 112.

The content source 102 may be configured to supply content, such as one or more content streams, content files, and/or the like. The content may comprise video data, audio data, closed caption (CC) data, a combination thereof, and/or the like. The content source 102 may comprise a content channel, a content stream source, a content file source, and/or the like. The content source 102 may be configured to supply content to the storage service 104. The content may be supplied according to a schedule, based on a trigger, upon receiving a command, a combination thereof, and/or the like. The content supplied to the storage service 104 may comprise source video 114.

The content source 102 may supply configuration information associated with the source video 114. The configuration information may be associated with distributing, transforming, encoding, transcoding, and/or the like the source video. The configuration information may comprise schedule data 116. The schedule data 116 may comprise a schedule for outputting video files in a video stream, a start time of the source video, an end time of the source video, and/or the like. In some scenarios the schedule data 116 may comprise a schedule of scene changes (e.g., or shot changes), a schedule of transformations to apply to the source video, a combination thereof, and/or the like. The configuration information may comprise additional data 118, such as graphics (e.g., graphic to overlay), transformation data (e.g., transformation functions and/or settings to apply), ratings data (e.g., V-chip data), advertisement signals (e.g., SCTE data), a combination thereof, and/or the like.

The content service 106 may be configured to manage the content stored by the storage service 104, such as the source video 114. The content service 106 may be implemented as one or more servers of a content distribution network and/or content access network. The one or more servers may comprise an origin server, and edge server, a combination thereof and/or the like. The content service 106 may comprise a packaging service, such as a just in time packager, and/or the like. The content service 106 may be configured to receive requests for content from a plurality of users. The content may comprise video data, audio data, closed caption (CC) data, a combination thereof, and/or the like. The content may comprise a plurality of content channels, such as live channels, streaming channels, cable channels, and/or the like. The content service 106 may comprise one or more servers.

The content service 106 may comprise a transcoder 120 (e.g., encoder) configured to encode, encrypt, compress, and/or the like the source video 114 from the content source 102. The content service 106 may be configured to package the content, segment the content, and/or the like. The content service 106 may generate (e.g., by subdividing the content) a plurality of content segments. The content service 106 may be configured to encode the content into multiple different sets of the plurality of content segments, such as one or more encoding sets (e.g., representation sets, resolution sets, bandwidth sets, screen size sets) of the content, sets for different resolutions (e.g., SD, HD, HD, 4 k, 1080p, 780p), screen sizes, codecs, and/or the like.

The content service 106 may comprise a transform service 122. The transform service 122 may be configured to apply one or more transformations to the source video 114. The one or more transformations may be applied prior to and/or after encoding the source video. The result of applying the encoding and/or the one or more transformations may comprise a video stream. The video stream may be generated based on a source video. Though the term video stream is used throughout, it is understood that the generated video may comprise a video file and/or video in any format whether stored or transmitted. The video stream may be generated by applying the one or more transformations to the source video. The one or more transformations may be applied based on the configuration data, the schedule data 116, the additional data 118, or a combination thereof. The one or more transformations may comprise one or more of modifying an appearance of the source video, adding a graphic overlay to the source video, adding a border to the source video, adding a transition to or from the source video, or fitting the source video into an window of an interface. The video stream may be output via the network 112.

The analytics service 108 may be configured to determine analytics, statistics, errors, validations, and/or the like associated with the video stream. The analytics service 108 may be configured sample the video stream via the network 112. The analytics service 108 may access (e.g., sample) the source video 114 via the storage service 104. The analytics service 108 may be configured to compare the video stream to the source video.

The analytics service 108 may be configured to determine a first plurality of scenes (e.g., or shots) of the video stream. A scene may begin/end if a camera view of the video changes, the video cuts from one view to another, and/or the like. The first plurality of scenes may be determined based on determining first scene boundaries in the video stream. A scene may be defined as a scene boundary time and a duration of time until the next scene boundary time. The analytics service 108 may determine the first plurality of scenes by analyzing imaging features of the video stream to detect scene changes. The analytics service 108 may store the first scene boundaries and associated first durations as return scene data 124 (e.g., or first scene data) associated with the video stream.

A scene boundary (e.g., or hard cut) may be detected based on color-based frame features in a sliding time window. One or more successive frames in the sliding time window may be compared based on the color-based frame features. If a threshold amount of difference in the color-based frame features is detected from one frame to another, then a scene boundary may be determined. In some implementations, a crossfade detector may be used to detect scene boundaries that occur with a crossfade (e.g., a gradual interlacing of a new scene with the old scene). Some scene boundaries that exist in the video stream may not be detected in the initial detection process. Constant letter boxes, pillar boxes, graphics, and/or the like may make successive frames more similar, resulting in missing scene boundary detection particularly in dark scenes. Different video encoding quality may affect and/or prevent the detection of scene boundaries.

The analytics service 108 may be configured to determine a second plurality of scenes of the source video. The second plurality of scenes may be determined based on determining second scene boundaries in the source video. The analytics service 108 may determine the second plurality of scenes by analyzing imaging features of the source video to detect scene changes. In some scenarios, the second scene boundaries and/or second plurality of scenes may be indicated in one or more of the schedule data 116 or the additional data 118. The second scene boundaries and/or second plurality of scenes may be provided along with the source video 114. The analytics service 108 may store the second scene boundaries and associated second durations as source scene data 126 (e.g., or second scene data) associated with the source video.

The analytics service 108 may be configured to generate analytics data 128 based on analysis of the video stream. The analytics data 128 may be generated based on analysis of the return scene data 124 and the source scene data 126. The analytics data 128 may be based on a comparison of the return scene data 124 and the source scene data 126. The analytics data 128 may comprises an indication of a number of matching scenes, un-matching scenes, or a combination thereof. The analytics data 128 may comprise an indication that the video stream is validated, invalid, has a number of errors, has a type of errors, and/or the like.

The analytics service 108 may compare one or more of the second plurality of scenes with one or more of the first plurality of scenes. The first scene boundaries of the video stream and second scene boundaries may be compared. Scene start times and scene durations of the second scene boundaries may be compared with scene start times (e.g., or boundary times) and scene durations of the first scene boundaries.

The analytics service 108 may be configured to determine a mismatch between the first scene boundaries (e.g., or a scene of the first plurality of scenes) and the second scene boundaries (e.g., or a scene of second plurality of scenes). A mismatch may occur when one or more boundaries of the second scene boundaries do not have corresponding matching boundaries in the first scene boundaries. There may be no scene boundaries in the first scene boundaries that have the same boundary time as a boundary time of one of the second scene boundaries. A mismatch may occur if the duration from one boundary to the next does not match (e.g., even if the boundary time and/or start time match). The analytics service 108 may be configured to select individual scenes of the second plurality of scenes. A subset of the second plurality of scenes may be determined. Each of the scenes in the subset may individually be compared to a target scene of the first plurality of scenes. The target scene may be defined as a start boundary time and a duration (e.g., the time until the next boundary time). Each scene in the subset may have a corresponding start boundary time and duration. A scene of the subset of scenes may be compared to the target scene by comparing one or more of the start boundary times and the durations. A difference between the two durations of the target scene and the selected scene may be determined and compared to a threshold. A difference between the start boundary times of the target scene and the selected scene may be determined and compared to the threshold. If one or more of the two calculated differences are less than the corresponding threshold, then the scenes may be determined to match. Otherwise, a mismatch may be detected.

The analytics service 108 may be configured to determine modified second scene boundaries and/or a modified scene of the second plurality of scenes. The modified second scene boundaries may be determined based on (e.g., in response to) the determining the mismatch. The modified second scene boundaries may be determined by removing one or more of the second scene boundaries. Determining modified second scene boundaries may comprise removing a scene boundary of the second scene boundaries that may be determined to not have a matching scene boundary in the first scene boundaries.

The analytics service 108 may be configured to determine the modified second scene boundaries by performing an iterative process. The iterative process may comprise an iterative process of removing individual scene boundaries of a portion the second scene boundaries until scene boundaries in the portion of the second scene boundaries match scene boundaries in a corresponding portion of the first scene boundaries. The removal of scene boundaries may comprise combining and/or merging at least two scenes into a single scene (e.g., or two shots into a single shot). If several scene boundaries in a row are not detected, then the iterative process may be performed several times to combine multiple scenes from the second scenes. An example matching process performed by the analytics service 108 is described further herein, such as in FIGS. 2-6 and the corresponding paragraphs.

The analytics service 108 may be configured to process the video stream and/or cause the video stream to be processed based on the analytics data 128. The video stream may be processed based on comparing the first scene boundaries and the modified second scene boundaries. The video stream may be processed based on detection of a threshold number of errors (e.g., number of mismatches). Processing the video stream may comprise one or more of validating the video stream, invalidating the video stream, determining if a threshold number of second scene boundaries are detected as missing, or sending a notification indicative of one or more errors associated with the video stream. If a certain number of errors are detected, then an alarm notification may be sent to a user and/or user interface.

Processing the video stream may comprise causing an action to be performed, such as changing a configuration associated with generating the video stream, reverting to a prior configuration associated with generating the video stream, changing to a default configuration associated with generating the video stream. The analytics service 108 may be configured to send a message to the content service 106 to cause the action to be performed. The content service 106 may change a configuration of the transform service 122, the transcoder 120, or a combination thereof. Additional processing resources may be added for use by the transform service 122 and/or transcoder 120. The content service 106 may cause a different transcoder and/or transform service (e.g., at a different geographic location, on a different computing device) to be used instead.

The user device 110 may be configured to receive content from one or more of the content service 106 or the storage service 104. The content may comprise the generated video stream, audio stream, and/or the like. The user device 110 may comprise a computing device, smart device (e.g., smart glasses, smart watch, smart phone), a mobile device, a tablet, a computing station, a laptop, a digital streaming device, a set-top box, a streaming stick, a television, and/or the like.

The user device 110 may be configured to receive the content via a communication unit. The communication unit may comprise a modem, network interface, and/or the like configured for communication via the network 112. The user device 110 may comprise a user interface unit. The user interface unit may be configured to cause display of a user interface. The user interface may be configured to allow the user to browse available content, such as content sent by the content service 106, content stored by the storage service 104, and/or the like. The user interface may be configured to allow users to request content, such as a content channel (e.g., or a content asset being supplied via a content channel), be stored (e.g., recorded) for later viewing. The user interface may be configured to cause storage of the content based on a configuration setting, such as a buffering setting associated with buffering content in storage (e.g., if a user begins watching a channel, if a rule is triggered, if the user is predicted to request the content at a time time).

The user device 110 may be configured to access an analytics user interface. The analytics user interface may allow users to view the analytics data 128. The analytics data 128 may be provided with additional data related to audio processing, network status, and/or other relevant information. The analytics user interface may allow the user to change configuration settings associated with the content service 106 and/or change the configuration information (e.g., the schedule data 116, the additional data 118) stored on the storage service 104.

Figure 2:
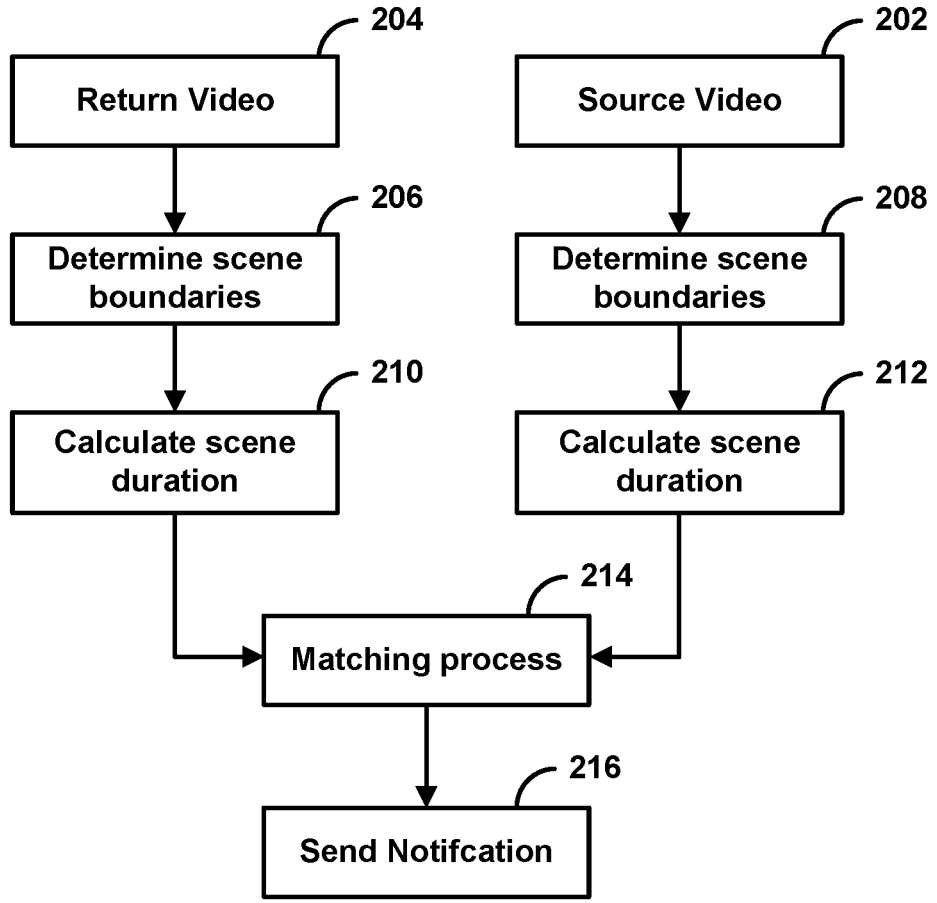
FIG. 2 shows an example process for analyzing video.

FIG. 2 shows an example process for analyzing video. The process 200 may comprise, at step 202, determining source video. The source video may be uploaded and/or sent to a service configured to store content. A user of a video distribution service may upload the source video. The source video may be used (e.g., by the video distribution service) to generate a video stream. The video stream may be accessed to determine return video, at step 204. The return video and the source video may be sampled. The samples may be stored in a storage location.

At step 206, the video stream (e.g., a stored sample of the video stream) may be analyzed to determine scene boundaries. A scene boundary may be detected based on detecting hard cuts (e.g., or other cuts, such as fades, cross-fades). A hard cut may be a transition from one scene (e.g., or shot) to another scene (e.g., or shot). The hard cuts may be identified as scene boundaries for a first plurality of scenes. At step 208, the source video (e.g., or stored sample of the source video) may be analyzed to determine scene boundaries. The hard cuts (e.g., other cuts, such as cross fades) may be identified as scene boundaries for a second plurality of scenes.

At step 210, one or more scene durations (e.g., or lengths) may be determined for one or more corresponding scenes of the first plurality of scenes. Scene duration may be calculated by subtracting time between two subsequent scene boundaries. At step 212, one or more scene durations may be determined for one or more corresponding scenes of the second plurality of scenes.

At step 214, a matching process may be performed. The matching process may be a recursive soft-matching process. The matching process may comprise one or more recursive rounds. In a round, a modification to one or more scenes, scene boundaries, and/or the like associated with the source content may be performed. The modified scene, scene boundary, and/or the like may be originally identified as not matching any corresponding scene, scene boundary, and/or the like associated with the video stream. The modified scene, scene boundary, and/or the like may be compared to scenes, scene boundaries, and/or the like associated with the video stream. Additional rounds may be performed until a match or an error conditions is determined.

At step 216, a notification may be sent. The notification may be sent to a user device. The notification may be sent via a dashboard application configured to provide analytics associated with one or more video streams. The notification may indicate a number of scenes matched, a number of scenes that are not matched, an error indicating that a threshold number of unmatched scenes within a time period, and/or the like.

Figure 3:
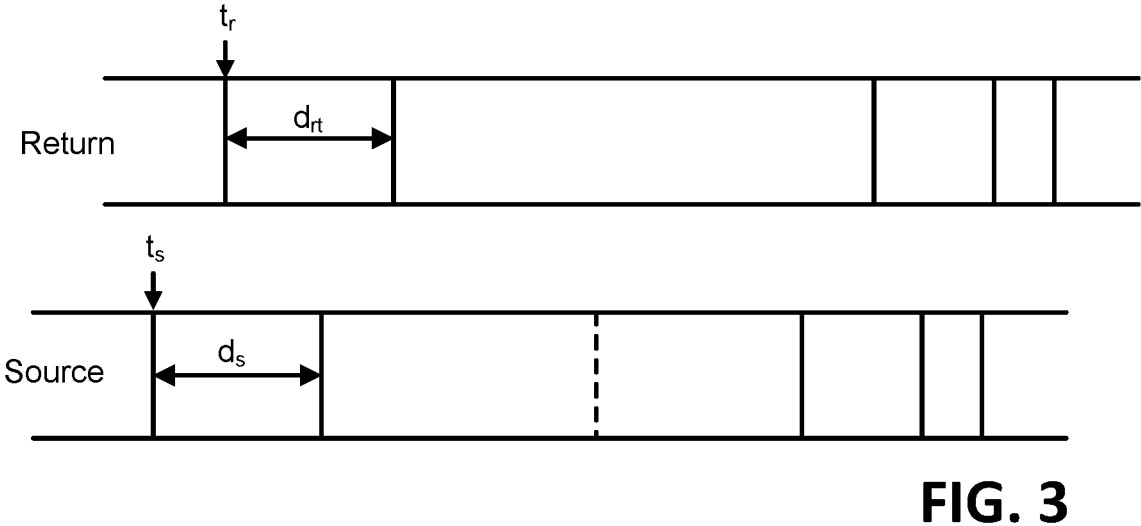
FIG. 3 shows example scenes of an example matching process.

FIG. 3 shows example scenes as part of an example matching process. On the top is shown a first plurality of scenes associated with a video stream (e.g., or returned video). On the bottom is shown a second plurality of scenes associated with source video (e.g., or scheduled video). Vertical lines indicate scene boundary points (e.g., or hard cut) between scenes. The dashed vertical line indicates an unmatched boundary point line. The unmatched boundary point may be a boundary point detected in the source video but not detected in the video stream. The boundary point may still exist in the video stream, but may not be detected due to any of a variety of issues, such as the addition of a transformation in generation of the video stream. As shown in the figures, the boundaries do not align between the return and source stream. This difference is shown to illustrate that a time delay may be introduced between source and return video. This delay is may be accounted for in a variety of ways, such as by determining an offset between the return and source as described in further detail below.

To resolve the mismatch, a matching process (e.g., recursive soft-matching process) may be performed. The matching process may comprise two parts—part A, and part B. Part A may comprise detection of matches, if there are any. Part A may comprise a first matching step. In the first matching step a ref_offset may be initially set as ref_offset=0. A given scene detected in the video stream starting at $t_r$ and having $d_{rt}$ duration may be defined as $(t_r, d_{rt})$. Part A may comprise any combination of the following example steps:

For a given scene (e.g., detected in the video stream, return video) starting at time $t_r$ and having $d_{rt}$ duration, the detected scene referred to as $(t_r, d_{rt})$, perform the following:

1. Get all scenes associated with the source video (e.g., from schedule data, or by detection from a video file) that belongs to $[t_r-20, t_r+d_{rt}+20] \rightarrow [(t_s(i), d_s(i))]$, $(t_r-20) < t_s(i) < (t_r+d_{rt}+20)$.

2. Match $(t_r, d_{rt})$ against $[(t_s(i), d_s(i))]$ if $|d_{rt}-d_s| < thr \rightarrow matched\_shot\_list$. The term thr refers to a first threshold and may have an example value of thr=0.1 s. The arrow indicates that matches are stored in the matched_shot_list.

3. If there is at least one match, calculate the offset as follows: $offset_j = t_r - t_s(j)$, for j in matched_shot_list.

4. Compare the offsets with ref_offset and keep only relevant matches $\rightarrow |offset_j - ref\_offset| < thr$. The term thr refers to a second threshold and may have an example value of thr=0.5 s.

5. If there is any match left, publish shot_match and push $offset_j$ to ref_offset_queue and update ref_offset as median(ref_offset_queue [: 100])

6. If there is no match, go to round B.

A more detailed explanation of these six steps is described as follows. At step 1, for the given scene detected in the video stream (e.g., or return video) a set of scenes is obtained from the source video. The set of scenes may be determined based on conditions for setting upper boundaries and/or lower boundaries of the set. Example conditions for selecting a range of scenes from the source video include conditions associated with the video stream, such as $[t_r-20, t_r+d_{rt}+20]$. The subtraction and addition of the number 20 allows for a range of scenes that might match due to delays inherent in the airing process. Throughout syndication/airing process there might be some expected delay introduced between timings in schedule data and actual airing times.

This expected delay could be due to satellite transmission delay, minor, and/or last-minute unreported changes in schedule data. For example, if there is a program scheduled to be aired at 05:00:00, the program might be actually aired 8 seconds later, at 05:00:08. This expected delay is less than 20 seconds based on historical analysis. It should be understood that any other number could be used to set a range of scenes to select from the source video. The reference offset ref_offset may be an offset that is based on and/or takes into account this source-to-return video offset.

The set of scenes selected from the source video are indicated as $[(t_s(i), d_s(i))]$. The i refers to the i-th scene in the set of selected scenes. Each scene may be defined by a start time $t_s(i)$ and a duration $d_s(i)$, where the subscript s indicates source. As indicated above by the condition $(t_r-20)<t_s(i)<(t_r+d_{rt}+20)$, the start time $t_s(i)$ may be within a lower boundary set by subtracting 20 seconds (e.g., or other appropriate amount) from the start time $t_r$ of the scene from the video stream being analyzed. An upper boundary for $t_s(i)$ may be set by adding 20 seconds (e.g., or other appropriate amount) to the sum of the start time $t_r$ and the duration $d_{rt}$ of the scene from the video stream being analyzed.

At step 2, the scene detected from the video stream $(t_r, d_{rt})$ is compared to one or more (or each) of the scenes in the set of scenes from the source video $[(t_s(i), d_s(i))]$. A match may be determined if a difference between the duration of a source scene and the duration of the scene from the video stream is below a first threshold, as indicated by the expression $d_{rt}-d_s|<thr$. Any matched scenes from the video source may be indicated on a matched shot list (e.g., matched_shot_list) and/or matched scene list.

At step 3, an $offset_j$ may be calculated separately for each of the matched scenes. The letter j refers to a corresponding index number assigned to and/or used to identify each of the matched scenes. The $offset_j$ for may be determined by subtracting the start time $t_s(j)$ of a scene on the matched shot list from the start time $t_r$ of the detected scene from the video stream.

At step 4, each of the offsets, $offset_j$, calculated in step 3 may be compared to a reference offset ref_offset. If the difference between the $offset_j$ for a particular matched scene and the ref_offset is less than a second threshold, then the particular matched scene may remain on the matched shot list, as indicated by the following expression $|offset_j-ref\_offset|<thr$. If the difference exceeds the second threshold, then the matched scene may be removed from the matched shot list.

At step 5, any remaining matching scenes (e.g., or the closest match) on the matched shot list may be indicated (e.g., via shot_match) as a scene matching the given scene detected in the video stream. The offset associated with the matching scene may be put in a queue of reference offsets ref_offset_queue. The queue of reference offsets may be used to determine an updated value for the ref_offset. The updated value may be determined based on an average, median, and/or the like of at least a portion (e.g., the first n number, such as 100) of the reference offsets in the queue.

Figure 4:
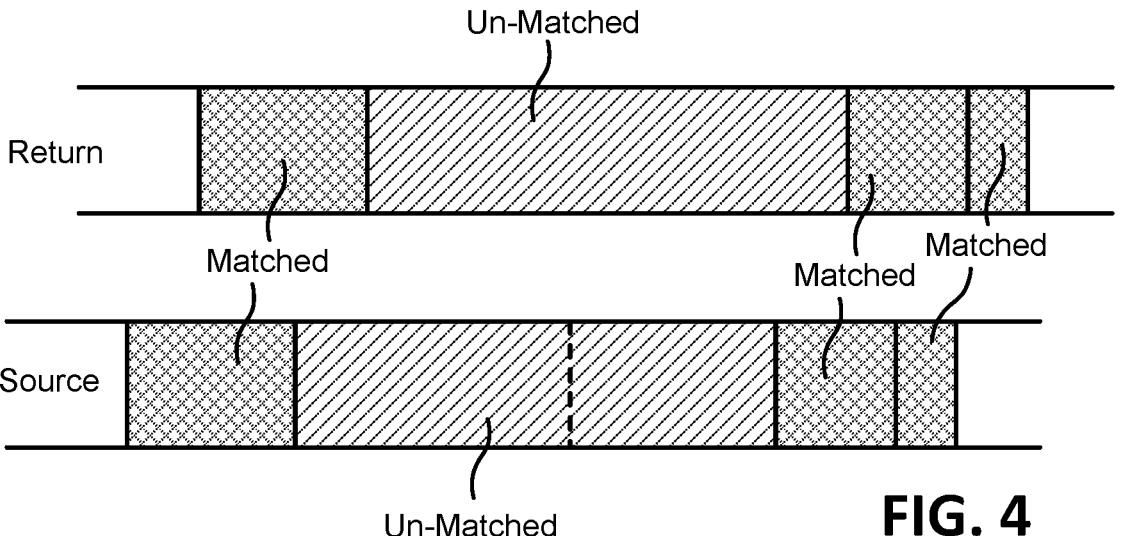
FIG. 4 shows example results of a matching process.

FIG. 4 shows example results of the matching process of FIG. 3. The example results may be results of part A of the matching process. Scenes that are matched between the first plurality of scenes and the second plurality of scenes are stored and/or published as shot_matched. These scenes are show in a crossed hatching. Unmatched scenes, shown in diagonal hatching may be sent to part B of the matching process. The failure to match these scenes may be due to a failure of the scene detection process to detect a scene boundary, illustrated by the dashed line. At the scene boundary, a graphic and/or other transformation applied to the original source video may have prevented detection of the scene boundary in the return video (e.g., aired video stream). Matching of these unmatched boundaries may be performed using Part B of the matching process as shown in FIG. 5.

Figure 5:
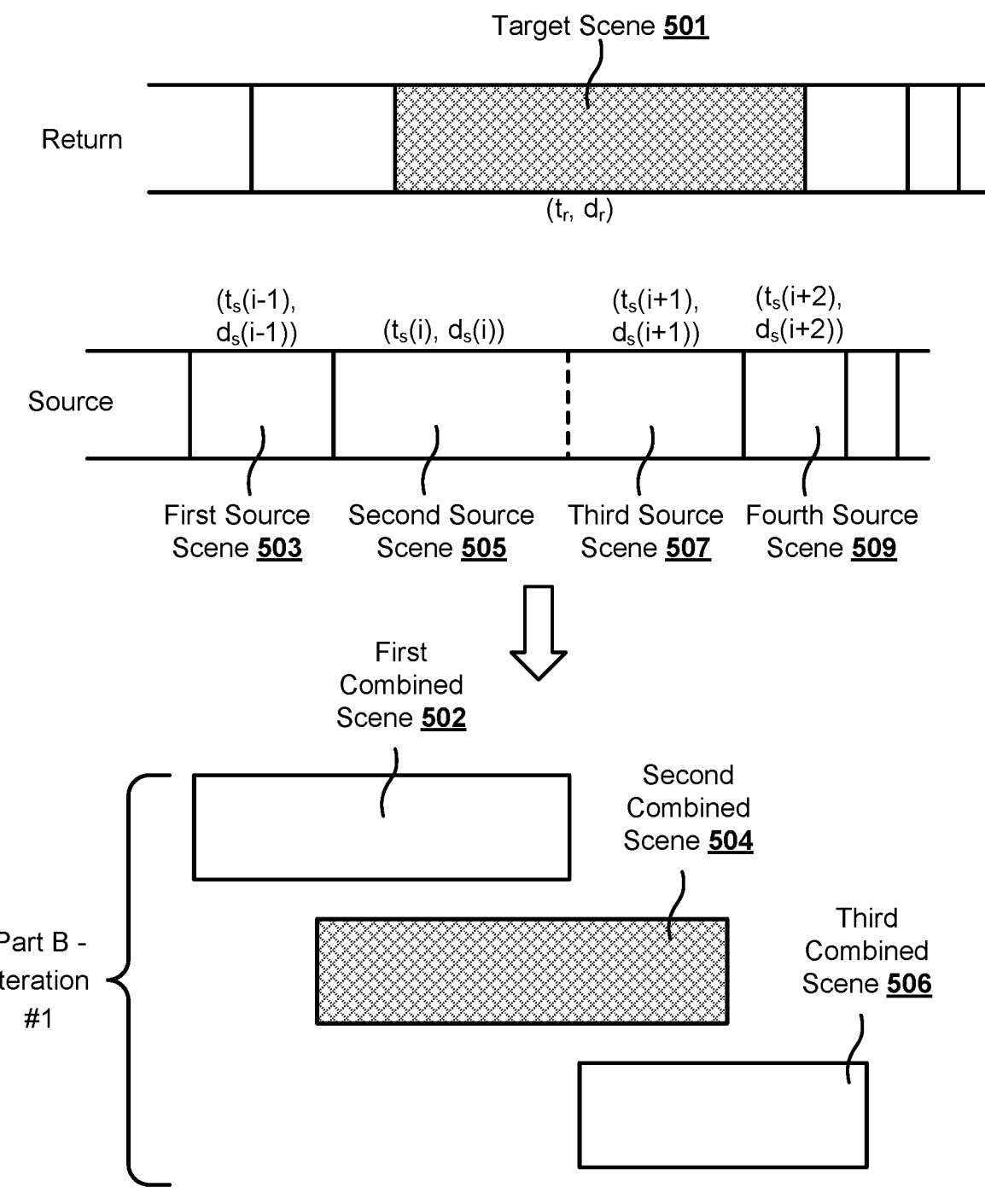
FIG. 5 shows an example matching process.

FIG. 5 shows an example portion of a matching process. Part B of the matching process may comprise recursively merging scenes associated with the source (e.g., or scheduled) video and comparing the merged scenes against a target scene associated with video stream (e.g., an unmatched scene associated with the video stream/returned video). Part B may comprise any combination of the following steps:

1. For each scene in the selected scenes of the source video, modify the duration by adding an adjacent scene (e.g., prior scene, next scene), and go to part A, step 2.
2. Stop after #(source scenes) tries. The #(source scenes) may comprise a threshold number of scenes, a number of unmatched scenes (e.g., in a row), and/or the like.
3. Publish shot_missed and stop. The scenes not found to match the scenes of the video stream may be added to shot_missed list.

The process of steps 1-3 of Part B may be triggered by a scene from the source video not matching the target scene. For example, the process may proceed from step 6 of Part A to step 1 of Part B. At step 1, a scene $(t_s(i), d_s(i))$ may be modified by maintaining the start time $t_s(i)$ and adding the duration $d_s(i)$ to the next duration $d_s(i+1)$. The entry for the next scene $(t_s(i+1), d_s(i+1))$ may be removed. The resulting scene may be compared to the detected scene from the video stream $(t_r, d_{rt})$. This process may be repeated until a threshold number of attempts, there are no more source scenes to combine, and/or any other condition. If the expanded scene matches, the expanded scene (e.g., or the original source scene) may be indicated and/or published on the matched shot list. If the expanded scene does not match (e.g., after repeated attempts to expand the boundaries of the scene, then the expanded scene (e.g., or the original source scene) may be indicated and/or published on the shots missed list.

In the example shown in FIG. 5, after one round of merging, the detected scene from the video source, indicated as target scene 501, may be matched to an expanded scene of the source video. The round of merging may include combining several scenes. A first source scene 503, a second source scene 505, a third source scene 507, and a fourth source scene 509 may be identified in the source video. Several combined scenes are determined by merging unmatched scenes of the source video with scenes immediately before or after. A first combined scene 502 is a combination of the first source scene 503 and the second source scene 505. A second combined scene 504 is a combination of the second source scene 505 and the third source scene 507. A third combined scene 506 is a combination of the third source scene 507 and the fourth source scene 509. The second combined scene 504, shown with cross hatching, is determined to match the target scene 501 of the video stream. The duration and/or start time of the second combined scene 504 are compared to the target scene 501 to determine the match. If a difference in the durations is less than a threshold, the match may be detected. If a difference in the start times is less than a threshold, the match may be detected.

Figure 6:
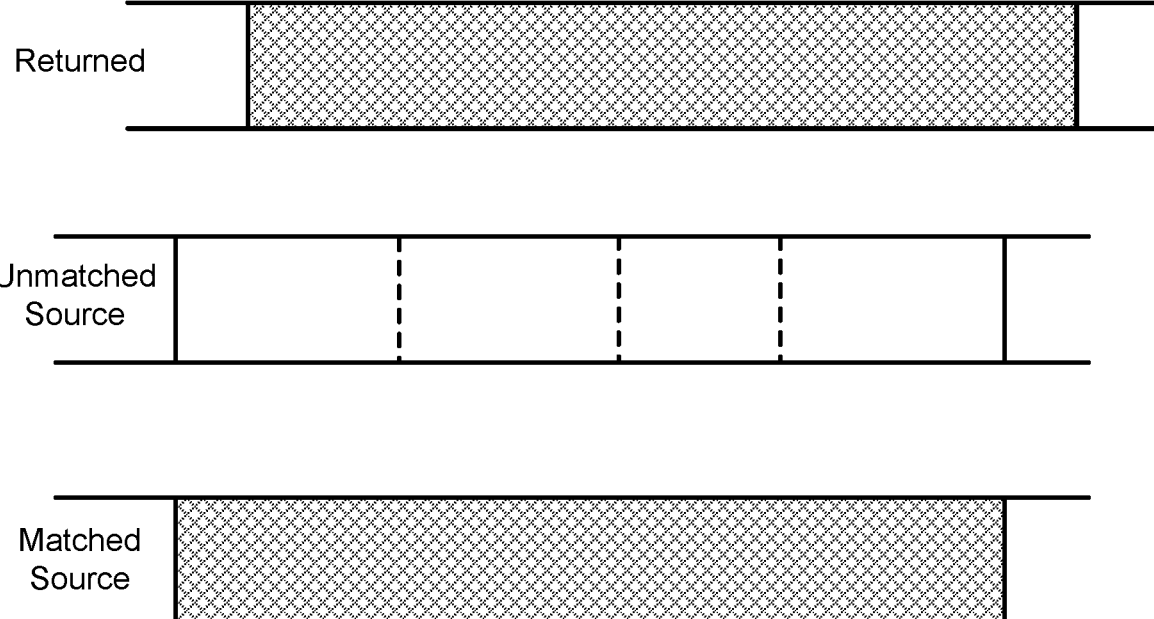
FIG. 6 shows an example matching process.

FIG. 6 shows an example matching process. The matching process may be applied to a scenario in which the source video is transformed in a 2-box display. In the 2-box display, the source video is shown in two smaller boxes during a transition from one show to another show. Each show may be shown in a corresponding box on the display. Due to the transformation of the source video, the process that detects video scenes may miss several scene changes. Thus, as shown in the top row of FIG. 6, only a one single long scene is detected in the video stream. As shown in the middle of FIG. 6, the source video may have four separate scenes corresponding to the one long scene. Using the matching process described herein, the unmatched scenes associated with the source video may be merged together, via one or more iterations. If only two scenes are matched per iteration, the recursive process (e.g., part B of the matching process) may be performed for 3 or more rounds before a match is found, as shown in the bottom row of FIG. 6.

FIG. 7 shows an example method 700 for processing content. The method 700 can comprise a computer implemented method. The method 700 can be implemented by one or more devices (e.g., computing devices, servers) and/or services disclosed herein, such as the devices, storage, and/or services of FIG. 1 and FIG. 10.

A video stream may be generated based on a source video. The video stream may be generated by applying one or more transformations to the source video. The one or more transformations may comprise one or more of modifying an appearance of the source video, adding a graphic overlay to the source video, adding a border to the source video, adding a transition to or from the source video, or fitting the source video into an window of an interface.

At step 702, first scene boundaries of the video stream and second scene boundaries associated with the source video used to generate the video stream may be compared. The first scene boundaries may be determined. The first scene boundaries may be determined based on analyzing imaging features of the video stream to detect scene changes. The second scene boundaries may be determined. The second scene boundaries may be determined based on analyzing imaging features of the source video to detect scene changes.

Comparing the first scene boundaries of the video stream and the second scene boundaries associated with the source video used to generate the video stream may comprise comparing scene start times and scene durations of the second scene boundaries with scene start times (e.g., or boundary times) and scene durations of the first scene boundaries.

At step 704, a mismatch between the first scene boundaries and the second scene boundaries may be determined. The mismatch between the first scene boundaries and the second scene boundaries may be determined based on the comparing. A mismatch may occur when one or more boundaries of the second scene boundaries do not have corresponding matching boundaries in the first scene boundaries. There may be no scene boundaries in the first scene boundaries that have the same boundary time as a boundary time of one of the second scene boundaries. A mismatch may occur if the duration from one boundary to the next does not match (e.g., even if the boundary time and/or start time match). An animation added to the video stream may prevent a scene boundary from being detected. As a result, the first scene boundaries may not have a scene boundary that is detected in the source video.

At step 706, modified second scene boundaries may be determined. The modified second scene boundaries may be determined based on (e.g., in response to) the determining the mismatch. The modified second scene boundaries may be determined by removing one or more of the second scene boundaries. Determining modified second scene boundaries may comprise removing a scene boundary of the second scene boundaries that may be determined to not have a matching scene boundary in the first scene boundaries.

Determining the modified second scene boundaries may comprise performing an iterative process. The iterative process may comprise an iterative process of removing individual scene boundaries of a portion the second scene boundaries until scene boundaries in the portion of the second scene boundaries match scene boundaries in a corresponding portion of the first scene boundaries. If several scene boundaries in a row are not detected, then the iterative process may be performed several times to combine multiple scenes from the second scenes. Each iteration may combine only two adjacent scenes, and/or add one additional scene to the already modified scene.

At step 708, a match or a mismatch may be determined. The match or mismatch may be determined based on comparing the first scene boundaries and the modified scene boundaries. The modified scene boundaries may be compared to target scene boundaries of the first scene boundaries. Comparison may comprise determining a target scene duration between the first scene boundaries and a modified scene duration between the modified scene boundaries. A first difference between the target scene duration and the modified scene duration may be determined. A second difference between a start boundary of the first scene boundaries and a start boundary of the modified scene boundaries may be determined. If the first difference is less than a threshold, the second difference is less than a threshold, or a combination thereof, then a match may be determined. Otherwise a mismatch may be determined. In some scenarios steps 706 and 708 may be repeated until a condition is met, such as a threshold number of matching attempts is reached, all unmatching scenes are merged, and/or the like.

At step 708, the video stream may be processed. The video stream may be processed based on the match, mismatch, determining the match or mismatch, or a combination thereof. Processing the video stream may comprise one or more of validating the video stream, invalidating the video stream, determining if a threshold number of second scene boundaries are detected as missing, sending data indicative of the match or mismatch, or sending a notification indicative of one or more errors associated with the video stream. Data indicative of matching, mismatching, validation, invalidation, errors, a combination thereof may be sent to a dashboard associated with providing analytics related to one or more video streams. If a certain number of errors are detected, then an alarm notification may be sent to a user and/or user interface. Processing the video stream may comprise causing an action to be performed, such as changing a configuration associated with generating the video stream, reverting to a prior configuration associated with generating the video stream, changing to a default configuration associated with generating the video stream, and/or the like.

Figure 8:
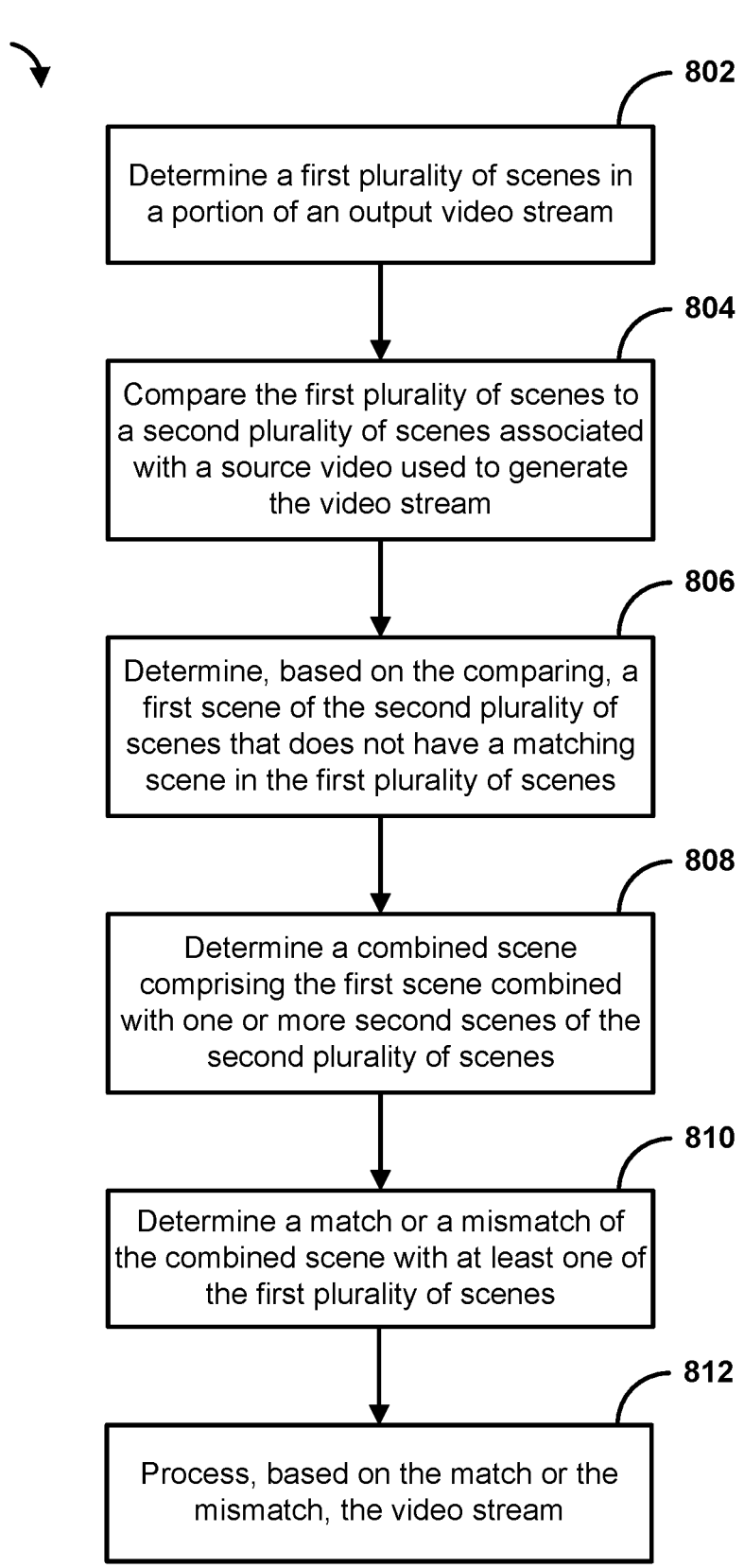
FIG. 8 shows an example method for processing content.

FIG. 8 shows an example method 800 for processing content. The method 800 can comprise a computer implemented method. The method 800 can be implemented by one or more devices (e.g., computing devices, servers) and/or services disclosed herein, such as the devices, storage, and/or services of FIG. 1 and FIG. 10.

A video stream may be generated based on a source video. The source video may comprise one or more video files. Each of the one or more video files may comprise video items, such as shows, episodes, movies, and/or the like. Generating the video stream may comprise applying a transformation to the source video. The transformation may be to adjust the video to a formatting requirement (e.g., from standard definition to high definition). The transformation may comprise one or more of modifying an appearance of the source video, adding a graphic overlay to the source video, adding a border to the source video, adding a transition to or from the source video, or fitting the source video into an window of an interface. The video stream may be output (e.g., via a network, via an output interface). The video stream may be distributed via a network, such as content distribution and/or access network. The video stream generated and/or output video may be sampled via a location in the network.

At step 802, a first plurality of scenes in a portion of the video stream may be determined (e.g., by a computing device). The first plurality of scenes may be determined as part of a validation and/or analysis process. Each of the first plurality of scenes may be defined by at least one scene boundary. Determining the first plurality of scenes may comprise analyzing the video stream to determine, based on detecting scene changes in the video stream, a first plurality of scene boundaries defining the first plurality of scenes. Determining the first plurality of scenes in the portion of the output video stream may comprise determining, for each scene, a start time of a starting scene boundary and a duration of the scene.

A second plurality of scenes may be determined (e.g., by the computing device). The second plurality of scenes may be associated with a source video used to generate the video stream. The second plurality of scenes may be determined based on the source video used to generate the video stream. Determining the second plurality of scenes may comprise analyzing the video stream to determine, based on detecting scene changes in the source video, a second plurality of scene boundaries defining the second plurality of scenes.

At step 804, the first plurality of scenes and the second plurality of scenes may be compared (e.g., by the computing device). Comparing the first plurality of scenes to the second plurality of scenes may comprise comparing the start time and scene duration for the first plurality of scenes to start times and scene durations to the second plurality of scenes. Each scene of the first plurality of scenes may be compared to all or a portion of the second plurality of scenes. A time offset may be determined between the first plurality of scenes and the second plurality of scenes. The time offset may be used to determine a start time of a scene in the first plurality of scenes that corresponds to a start time of a scene in the second plurality of scenes. If the start times for two scenes match, but the duration does not match, then the compared scenes may be identified as not matching.

At step 806, a first scene of the second plurality of scenes that does not have a matching scenes in the first plurality of scenes may be determined. The first scene may be determined based on the comparing of step 804. The start time and/or duration of the first scene may be compared to each of the first plurality of scenes. If no matches are found, then the first scene may be identified as not having a matching scene. An indication of the first scene (e.g., the start time and duration) may be stored on a list of non-matching scenes. The first scene may not match any of the first plurality of scenes because graphics overlaid on the video stream may have caused scene changes in the video stream not to be recognized.

At step 808, a combined scene may be determined. The combined scene may comprise the first scene combined with one or more second scenes of the second plurality of scenes. The one or more second scenes may comprise scenes subsequent to, adjacent to, and/or directly following the first scene. Determining the combined scene may comprise performing an iterative process of combining scenes of a portion of the plurality of second scenes until the combined scene matches a scene associated with a corresponding portion of the first plurality of scenes. Matching may be performed after each combination of scenes. If the first scene is followed by two unmatched scenes, the first scene may be matched with the next scene. If that resulting combined scene does not match, then the combined scene may be combined again with the following scene. The combination of all three scenes may be recognized as matching a scene of the first plurality of scenes.

At step 810, a match or a mismatch of the combined scene with at least one of the first plurality of scenes may be determined. The match or mismatch may be determined based on comparing one or more of the first plurality of scenes with the combined scene. The combined scene may be compared to a target scene of the first plurality of scenes. Comparison may comprise determining a target scene duration between first scene boundaries and a modified scene duration between the scene boundaries of the combined scene. A first difference between the target scene duration and the modified scene duration may be determined. A second difference between a start boundary of the first scene boundaries and a start boundary of the combined scene may be determined. If the first difference is less than a threshold, the second difference is less than a threshold, or a combination thereof, then a match may be determined. Otherwise a mismatch may be determined. In some scenarios steps 808 and 810 may be repeated until a condition is met, such as a threshold number of matching attempts is reached, all unmatching scenes are merged, and/or the like.

At step 812, the video stream (e.g., one or more of the first plurality of scenes) may be processed. The one or more of the video stream may be processed based on the match, the mismatch, determining the match of mismatch, or a combination thereof. Processing the video stream may comprise one or more of validating the video stream, invalidating the video stream, determining if a threshold number of second scene boundaries are detected as missing, sending data indicative of the match or mismatch, or sending a notification indicative of one or more errors associated with the video stream. Data indicative of matching, mismatching, validation, invalidation, errors, a combination thereof may be sent to a dashboard associated with providing analytics related to one or more video streams. Processing the video stream may comprise causing an action to be performed, such as changing a configuration associated with generating the video stream, reverting to a prior configuration associated with generating the video stream, changing to a default configuration associated with generating the video stream, and/or the like.

FIG. 9 shows an example method 900 for processing content. The method 900 can comprise a computer implemented method. The method 900 can be implemented by one or more devices (e.g., computing devices, servers) and/or services disclosed herein, such as the devices, storage, and/or services of FIG. 1 and FIG. 10.

At step 902, a source video and configuration information may be received. The source video may be uploaded and/or sent to a service configured to store content. A user of a video distribution service may upload the source video. The source video may be uploaded as one or more files, as part of a periodic and/or scheduled upload, and/or the like. The source video may comprise video items, such as shows, episodes, movies, and/or the like.

The configuration information may comprise schedule data. The schedule data may comprise a schedule for output video files in a video stream, a schedule of scene changes, a schedule of transformation to apply to the source video, a combination thereof, and/or the like. The configuration information may comprise transformation data, such as graphics (e.g., graphic to overlay), transformation functions to apply, ratings data (e.g., V-chip data), advertisement signals (e.g., SCTE data), a combination thereof, and/or the like.

At step 904, a video stream may be generated. The video stream may be generated based on the configuration information and the source video. Generating the video stream may comprise applying a transformation to the source video. The transformation may comprise one or more of modifying an appearance of the source video, adding a graphic overlay to the source video, adding a border to the source video, adding a transition to or from the source video, or fitting the source video into an window of an interface. If the transformation data comprises a network logo, then the network logo may be added as an overlay at one or more times in the video stream.

At step 906, a first plurality of scenes associated with the video stream and a second plurality of scenes associated with the source video may be determined. Determining the first plurality of scenes associated with the video stream may comprise analyzing imaging features of the video stream to detect scene changes in the video stream. The imaging features may comprise coloring information, pixel information, encoding information, and/or a combination thereof. Determining the second plurality of scenes may comprise analyzing imaging features of the source video to detect scene changes in the source video. The first plurality of scenes may comprise defined based on hard cuts in the edited video (e.g., change that occurs within a threshold period of time), video camera changes from one angle to another, one shot to the next, and/or the like. An example scene change may occur when a show changes from a scene in a house to a scene outside of the house, from a talking head scene to a montage scene, from one talking head to another talking head, and/or the like.

At step 908, scene boundaries of the second plurality of scenes may be updated iteratively to match scene boundaries of the first plurality of scenes. The scene boundaries may be updated as part of a validation and/or analysis process. Iteratively updating scene boundaries of the second plurality of scenes to match scene boundaries of the first plurality of scenes may comprise updating the scene boundaries until one or more of a matching condition may be satisfied or an error condition is satisfied. Iteratively updating scene boundaries of the second plurality of scenes to match scene boundaries of the first plurality of scenes may comprise one or more of removing a scene boundary of the second plurality of scenes or combining two scenes of the second plurality of scenes.

The validation process may identify an unmatched scene in the second plurality of scenes and a target unmatched scene in the first plurality of scenes. The target unmatched scene may comprise a scene in which the source video is shown in a smaller box before transitioning to another show. Though several scene changes may occur, these changes may not be detected due to the transformation of displaying the source video in the smaller box. In a first round of the iterative process, the unmatched scene may be merged with the following scene by remove the scene boundary between the two scenes.

At step 910, a match or a mismatch (e.g., a scene with updated scene boundaries) with at least one of the first plurality of scenes may be determined based on the iterative updating of the scene boundaries. The modified scene boundaries may be compared to target scene boundaries of the target unmatched scene. Comparison may comprise determining a target scene duration between the first scene boundaries and an updated scene duration between the updated scene boundaries. A first difference between the target scene duration and the modified scene duration may be determined. A second difference between a start boundary of the first scene boundaries and a start boundary of the modified scene boundaries may be determined. If the first difference is less than a threshold, the second difference is less than a threshold, or a combination thereof, then a match may be determined. Otherwise a mismatch may be determined. In some scenarios steps 908 and 910 may be repeated until a condition is met, such as a threshold number of matching attempts is reached, all unmatching scenes are merged, and/or the like.

At step 912, the video stream may be processed. The video stream may be processed based on the match, mismatch, determining the match or mismatch, or a combination thereof. Processing the video stream may comprise one or more of validating the video stream, invalidating the video stream, determining if a threshold number of second scene boundaries are detected as missing, or sending a notification indicative of one or more errors associated with the video stream. Data indicative of matching, mismatching, validation, invalidation, errors, a combination thereof may be sent to a dashboard associated with providing analytics related to one or more video streams. Processing the video stream may comprise causing an action to be performed, such as changing a configuration associated with generating the video stream, reverting to a prior configuration associated with generating the video stream, changing to a default configuration associated with generating the video stream, and/or the like.

Figure 10:
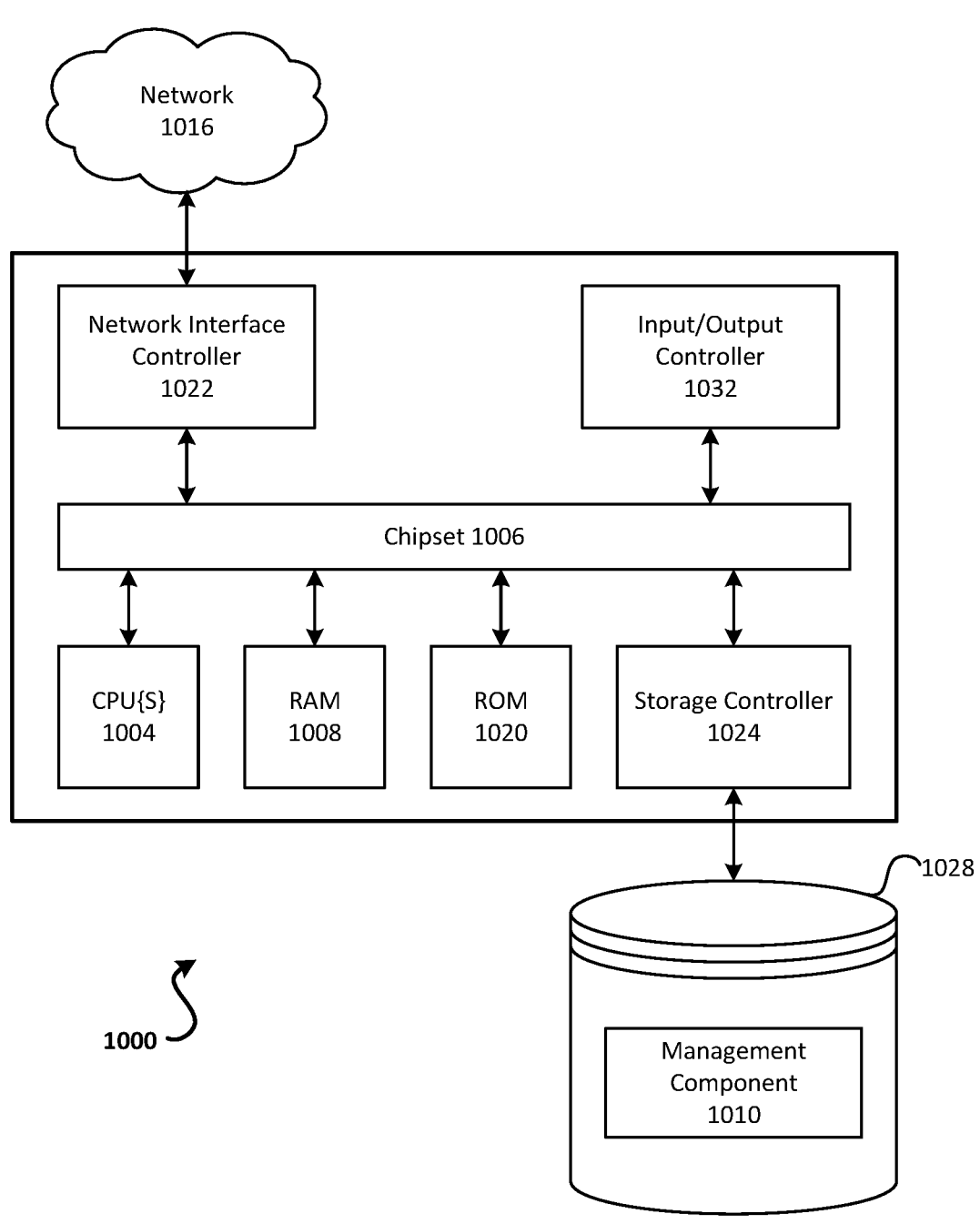
FIG. 10 is a block diagram illustrating an example computing device.

FIG. 10 depicts a computing device that may be used in various aspects, such as the services, servers, nodes, and/or devices depicted in FIG. 1. With regard to FIG. 1, the content source 102, storage service 104, content service 106, analytics service 108, and user device 110 may each be implemented in an instance of a computing device 1000 of FIG. 10. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 1-9.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN) 1016. The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on a mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described in relation to FIGS. 1-9.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
comparing first scene boundaries associated with a video stream and second scene boundaries associated with a source video used to generate the video stream;
determining, based on the comparing, a mismatch between the first scene boundaries and the second scene boundaries;
determining, based on the determining the mismatch and by removing one or more of the second scene boundaries, modified second scene boundaries;
determining, based on comparing the first scene boundaries and the modified second scene boundaries, a match or a mismatch; and
processing, based on the match or the mismatch, the video stream.

2. The method of claim 1, wherein determining, based on the determining the mismatch and by removing one or more of the second scene boundaries, modified second scene boundaries comprises removing a scene boundary of the second scene boundaries that is determined to not have a matching scene boundary in the first scene boundaries.

3. The method of claim 1, wherein processing the video stream comprises one or more of validating the video stream, invalidating the video stream, determining if a threshold number of second scene boundaries are detected as missing, or sending a notification indicative of one or more errors associated with the video stream.

4. The method of claim 1, further comprising determining, based on analyzing imaging features of the video stream to detect scene changes, the first scene boundaries.

5. The method of claim 1, further comprising generating the video stream by applying a transformation to the source video, wherein the transformation comprises one or more of modifying an appearance of the source video, adding a graphic overlay to the source video, adding a border to the source video, adding a transition to or from the source video, or fitting the source video into a window of an interface.

6. The method of claim 1, wherein determining the modified second scene boundaries comprises performing an iterative process of removing individual scene boundaries of a portion the second scene boundaries until scene boundaries in the portion of the second scene boundaries match scene boundaries in a corresponding portion of the first scene boundaries.

7. The method of claim 1, wherein comparing the first scene boundaries of the video stream and the second scene boundaries associated with the source video used to generate the video stream comprises comparing scene start times and scene durations of the second scene boundaries with scene start times and scene durations of the first scene boundaries.

8. A device comprising:
one or more processors; and
memory storing instructions that, when executed by the one or more processors, cause the device to:
compare first scene boundaries associated with a video stream and second scene boundaries associated with a source video used to generate the video stream;
determine, based on the comparing, a mismatch between the first scene boundaries and the second scene boundaries;
determine, based on the determining the mismatch and by removing one or more of the second scene boundaries, modified second scene boundaries;
determine, based on comparing the first scene boundaries and the modified second scene boundaries, a match or a mismatch; and
process, based on the match or the mismatch, the video stream.

9. The device of claim 8, wherein the instructions that, when executed by the one or more processors, cause the device to determine, based on the determining the mismatch and by removing one or more of the second scene boundaries, modified second scene boundaries comprises instructions that, when executed by the one or more processors, cause the device to remove a scene boundary of the second scene boundaries that is determined to not have a matching scene boundary in the first scene boundaries.

10. The device of claim 8, wherein the instructions that, when executed by the one or more processors, cause the device to process the video stream comprises instructions that, when executed by the one or more processors, cause the device to one or more of validate the video stream, invalidate the video stream, determine if a threshold number of second scene boundaries are detected as missing, or send a notification indicative of one or more errors associated with the video stream.

11. The device of claim 8, wherein the instructions, when executed by the one or more processors, further cause the device to determine, based on analyzing imaging features of the video stream to detect scene changes, the first scene boundaries.

12. The device of claim 8, wherein the instructions, when executed by the one or more processors, further cause the device to generate the video stream by applying a transformation to the source video, wherein the transformation comprises one or more of modifying an appearance of the source video, adding a graphic overlay to the source video, adding a border to the source video, adding a transition to or from the source video, or fitting the source video into a window of an interface.

13. The device of claim 8, wherein the instructions that, when executed by the one or more processors, cause the device to determine the modified second scene boundaries comprises instructions that, when executed by the one or more processors, cause the device to perform an iterative process of removing individual scene boundaries of a portion the second scene boundaries until scene boundaries in the portion of the second scene boundaries match scene boundaries in a corresponding portion of the first scene boundaries.

14. The device of claim 8, wherein the instructions that, when executed by the one or more processors, cause the device to compare the first scene boundaries of the video stream and the second scene boundaries associated with the source video used to generate the video stream comprises instructions that, when executed by the one or more processors, cause the device to compare scene start times and scene durations of the second scene boundaries with scene start times and scene durations of the first scene boundaries.

15. A system comprising:
a first computing device configured to generate, based on a source video, a video stream; and
a second computing device configured to:
   compare first scene boundaries associated with the video stream and second scene boundaries associated with the source video used to generate the video stream;
   determine, based on the comparing, a mismatch between the first scene boundaries and the second scene boundaries;
   determine, based on the determining the mismatch and by removing one or more of the second scene boundaries, modified second scene boundaries;
   determine, based on comparing the first scene boundaries and the modified second scene boundaries, a match or a mismatch; and
   process, based on the match or the mismatch, the video stream.

16. The system of claim 15, wherein the second computing device is configured to determine, based on the determining the mismatch and by removing one or more of the second scene boundaries, modified second scene boundaries based on removing a scene boundary of the second scene boundaries that is determined to not have a matching scene boundary in the first scene boundaries.

17. The system of claim 15, wherein the second computing device is configured to process the video stream based on one or more of validating the video stream, invalidating the video stream, determining if a threshold number of second scene boundaries are detected as missing, or sending a notification indicative of one or more errors associated with the video stream.

18. The system of claim 15, wherein the second computing device is further configured to determine, based on analyzing imaging features of the video stream to detect scene changes, the first scene boundaries.

19. The system of claim 15, wherein the first computing device is further configured to generate the video stream by applying a transformation to the source video, wherein the transformation comprises one or more of modifying an appearance of the source video, adding a graphic overlay to the source video, adding a border to the source video, adding a transition to or from the source video, or fitting the source video into a window of an interface.

20. The system of claim 15, wherein the second computing device is configured to determine the modified second scene boundaries based on performing an iterative process of removing individual scene boundaries of a portion the second scene boundaries until scene boundaries in the portion of the second scene boundaries match scene boundaries in a corresponding portion of the first scene boundaries.

21. The system of claim 15, wherein the second computing device is configured to compare the first scene boundaries of the video stream and the second scene boundaries associated with the source video used to generate the video stream based on comparing scene start times and scene durations of the second scene boundaries with scene start times and scene durations of the first scene boundaries.

22. A non-transitory computer-readable medium storing computer-executable instructions that, when executed, cause:
   comparing first scene boundaries associated with a video stream and second scene boundaries associated with a source video used to generate the video stream;
   determining, based on the comparing, a mismatch between the first scene boundaries and the second scene boundaries;
   determining, based on the determining the mismatch and by removing one or more of the second scene boundaries, modified second scene boundaries;
   determining, based on comparing the first scene boundaries and the modified second scene boundaries, a match or a mismatch; and
   processing, based on the match or the mismatch, the video stream.

23. The non-transitory computer-readable medium of claim 22, wherein determining, based on the determining the mismatch and by removing one or more of the second scene boundaries, modified second scene boundaries comprises removing a scene boundary of the second scene boundaries that is determined to not have a matching scene boundary in the first scene boundaries.

24. The non-transitory computer-readable medium of claim 22, wherein processing the video stream comprises one or more of validating the video stream, invalidating the video stream, determining if a threshold number of second scene boundaries are detected as missing, or sending a notification indicative of one or more errors associated with the video stream.

25. The non-transitory computer-readable medium of claim 22, wherein the instructions, when executed, further cause determining, based on analyzing imaging features of the video stream to detect scene changes, the first scene boundaries.

26. The non-transitory computer-readable medium of claim 22, wherein the instructions, when executed, further cause generating the video stream by applying a transformation to the source video, wherein the transformation comprises one or more of modifying an appearance of the source video, adding a graphic overlay to the source video, adding a border to the source video, adding a transition to or from the source video, or fitting the source video into a window of an interface.

27. The non-transitory computer-readable medium of claim 22, wherein determining the modified second scene boundaries comprises performing an iterative process of removing individual scene boundaries of a portion the second scene boundaries until scene boundaries in the portion of the second scene boundaries match scene boundaries in a corresponding portion of the first scene boundaries.

28. The non-transitory computer-readable medium of claim 22, wherein comparing the first scene boundaries of the video stream and the second scene boundaries associated with the source video used to generate the video stream comprises comparing scene start times and scene durations of the second scene boundaries with scene start times and scene durations of the first scene boundaries.

* * * * *